(12) United States Patent
Wang et al.

(10) Patent No.: US 10,523,457 B2
(45) Date of Patent: Dec. 31, 2019

(54) NETWORK COMMUNICATION METHOD, SYSTEM AND CONTROLLER OF PCIE AND ETHERNET HYBRID NETWORKS

(71) Applicant: Industrial Technology Research Institute, Hsinchu (TW)

(72) Inventors: Tzu-Lin Wang, New Taipei (TW); Yu-Wei Lee, Changhua County (TW); Tzi-Cker Chiueh, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 126 days.

(21) Appl. No.: 15/849,691

(22) Filed: Dec. 21, 2017

(65) Prior Publication Data

US 2019/0199544 A1    Jun. 27, 2019

(51) Int. Cl.
| | | |
|---|---|---|
| *H04L 29/08* | (2006.01) | |
| *H04L 12/18* | (2006.01) | |
| *H04L 12/931* | (2013.01) | |
| *H04L 12/823* | (2013.01) | |
| *H04L 12/721* | (2013.01) | |
| *H04L 12/741* | (2013.01) | |

(52) U.S. Cl.
CPC .......... *H04L 12/1886* (2013.01); *H04L 47/32* (2013.01); *H04L 49/60* (2013.01); *H04L 45/66* (2013.01); *H04L 45/745* (2013.01)

(58) Field of Classification Search
CPC ......... H04L 69/22; H04L 49/70; H04L 45/66; H04L 45/7457; H04L 49/25; H04L 49/65; H04L 41/0893; H04L 45/745; H04L 12/4633; H04L 45/00; H04L 45/54; H04L 45/7453; H04L 47/10
See application file for complete search history.

(56) References Cited

U.S. PATENT DOCUMENTS

| | | |
|---|---|---|
| 8,677,023 B2 | 3/2014 | Venkataraghavan et al. |
| 8,953,619 B2 | 2/2015 | Basso et al. |

(Continued)

FOREIGN PATENT DOCUMENTS

| | | |
|---|---|---|
| CN | 102880540 | 1/2013 |
| CN | 103181133 | 12/2015 |

(Continued)

OTHER PUBLICATIONS

Office Action of Taiwan Counterpart Application, dated Aug. 24, 2018, pp. 1-5.

(Continued)

*Primary Examiner* — Sai Aung

(74) *Attorney, Agent, or Firm* — JCIPRNET

(57) ABSTRACT

A network communication method, a system and a controller of PCIe and Ethernet hybrid networks are provided. In one example of the network communication method, a packet is transmitted or received via a network interface (NIC). The packet is transmitted via an Ethernet over PCIe (EoP) port by adopting a PCIe based EoP architecture based on a PCIe bus for an intra-rack transmission, and the packet is transmitted via an Ethernet port for an inter-rack transmission. If the transmitted packet belongs to a broadcast packet, the network interface receiving the packet discards the packet or transmits the packet to the controller without re-broadcasting the packet again.

8 Claims, 8 Drawing Sheets

(56) References Cited

U.S. PATENT DOCUMENTS

| | | | |
|---|---|---|---|
| 8,958,427 | B2 | 2/2015 | Basso et al. |
| 9,337,939 | B2 | 5/2016 | Kim et al. |
| 9,734,115 | B2 | 8/2017 | Lee et al. |
| 9,760,455 | B2 | 9/2017 | Lee et al. |
| 2009/0154469 | A1 | 6/2009 | Winter |
| 2011/0296076 | A1 | 12/2011 | Hu et al. |
| 2013/0242987 | A1 | 9/2013 | Basso et al. |
| 2013/0242990 | A1 | 9/2013 | Basso et al. |
| 2013/0346665 | A1 | 12/2013 | Freking et al. |
| 2014/0064056 | A1 | 3/2014 | Sakata et al. |
| 2015/0023173 | A1* | 1/2015 | Sharma ............... H04L 47/122 370/236 |
| 2016/0127480 | A1* | 5/2016 | Rose .................... H04L 67/16 |
| 2016/0335209 | A1 | 11/2016 | Jau et al. |
| 2017/0041248 | A1* | 2/2017 | Toy ................. H04Q 11/0067 |
| 2017/0052916 | A1 | 2/2017 | Kollu |
| 2017/0147456 | A1 | 5/2017 | Lee et al. |
| 2017/0257151 | A1* | 9/2017 | Lange ..................... H04B 7/04 |
| 2018/0176036 | A1 | 6/2018 | Butcher et al. |
| 2019/0109783 | A1* | 4/2019 | Kommula ............... H04L 45/26 |

FOREIGN PATENT DOCUMENTS

| | | |
|---|---|---|
| CN | 104247341 | 6/2017 |
| TW | I331281 | 10/2010 |

OTHER PUBLICATIONS

Dawei Zang, et al., "PROP: Using PCIe-based RDMA to Accelerate Rack-Scale Communications in Data Centers," IEEE ICPADS, Dec. 2015, pp. 465-472.

Takashi Yoshikawa, et al., "Bridge Chip Composing a PCIe Switch over Ethernet to Make a Seamless Disaggregated Computer in Data-Center Scale," Hot Chips 26 Symposium (HCS), IEEE, Aug. 2014, pp. 1.

Jun Suzuki, et al., "ExpressEther—Ethernet-Based Virtualization Technology for Reconfigurable Hardware Platform," IEEE HOTI, Aug. 2006. pp. 1-7.

Venkata Krishnan, et al., "A Case Study in I/O Disaggregation using PCI Express Advanced Switching Interconnect (ASI)," IEEE HOTI, Aug. 2006, pp. 1-7.

Toshihiro Hanawa, et al., "PEARL: Power-aware, Dependable, and High-Performance Communication Link using PCI Express," IEEE CLUSTERWKSP, Dec. 2010, pp. 284-291.

L. Rota, et al., "A PCIe DMA Architecture for Multi-Gigabyte Per Second Data Transmission," IEEE Transactions on Nuclear Science, vol. 62, Issue 3, Jun. 2015, pp. 972-976.

"Office Action of Taiwan Related Application, application No. 107131372", dated May 10, 2019, p. 1-p. 10.

\* cited by examiner

| Priority | MAC Address | Port /600 |
|---|---|---|
| priority | MAC 610a | port 620a |
| priority | MAC 610b | port 620b |
| ⋮ | ⋮ | ⋮ |
| priority | MAC 610n | port 620n |

NETWORK COMMUNICATION METHOD, SYSTEM AND CONTROLLER OF PCIE AND ETHERNET HYBRID NETWORKS

TECHNICAL FIELD

The disclosure relates to a network communication method, a system and a controller of PCIe and Ethernet hybrid networks.

BACKGROUND

Peripheral Component Interconnect Express (PCIe) is an industry standard computer expansion technology developed by the PCI Special Interest Group (PCI-SIG). PCIe was initially designed as a local bus interconnect technology for connecting the CPU, GPU, and I/O devices in a machine, and then developed to become a completely mature switched network featuring point-to-point links, hop-by-hop flow control, end-to-end retransmission, and so on. PCIe may also be used as an expansion interface for connecting the machine and an external apparatus (e.g. a storage device).

A PCIe network is a switched network with serial point-to-point full duplex lanes. A PCIe device is connected to the PCIe network through a link formed by one or more lanes. Recently, expanded PCIe which uses a PCIe interface to interconnect multiple servers or virtualized I/O devices has become the standard. For example, application of PCIe may be further expanded to intra-rack interconnect. A PCIe switch may replace a standard top of rack (TOR) Ethernet switch. That is, PCIe may connect multiple hosts (e.g. servers) in one rack. The I/O devices that are allowed to be connected to the PCIe switch may be shared by all the servers in the same rack. All the servers in the rack may also communicate with each other through PCIe links.

Currently, the PCIe can conduct a packet transmission among multiple servers in the same rack but cannot conduct the packet transmission across different racks. Moreover, an Ethernet broadcast behavior is not supported either.

SUMMARY

In one exemplary embodiment of the disclosure, t a network communication method of PCIe and Ethernet hybrid networks is introduced. In the embodiment, a packet is transmitted or received via a network interface. Here, if the packet is a unicast transmission, the packet is transmitted via a PCIe based Ethernet over PCIe (EoP) port for an intra-rack transmission, and the packet is transmitted via an Ethernet port for an inter-rack transmission. If the packet is a broadcast transmission, the packet is discarded or the packet is transmitted to a controller in response to the packet.

In one exemplary embodiment of the disclosure, a network communication system of PCIe and Ethernet hybrid networks is introduced. In the embodiment, the network communication system includes a network interface and a controller. The network interface is coupled to the controller and configured to perform operations of: transmitting or receiving a packet, wherein the packet is transmitted via an EoP port by adopting an EoP architecture based on a PCIe bus for an intra-rack transmission, and the packet is transmitted via an Ethernet port for an inter-rack transmission; and if the packet is a broadcast transmission, the packet is discarded or the packet is transmitted to a controller in response to the packet.

In one exemplary embodiment of the disclosure, a controller, adapted to a network communication system of PCIe and Ethernet hybrid networks, is introduced. In the embodiment, the controller includes a memory and a processor. The processor is coupled to the memory, and configured to manage transmissions among a plurality of hosts in one rack and different racks. The processor is set to execute receiving of a packet, wherein the packet is from a network interface of an external destination host and the packet is determined according to a rule table as mismatching to all rules in the rule table, wherein the packet includes port information; generating determination information by determining whether the port information is correlated to an Ethernet over PCIe (EoP) or an Ethernet port according to the port information; and generating another rule to be transmitted to the external destination host according to the determination information and the packet, wherein the external destination host stores another rule to the rule table in response to the external source host, and the external host system no longer re-broadcasts the packet.

Based on at least the exemplary embodiments of the disclosure, with the hosts adopting the EoP port for the intra-rack transmission and the hosts adopting the Ethernet port for the inter-rack transmission, each of the hosts among the multiple racks can utilize a maximum bandwidth of the PCIe bus to accelerate the intra-rack transmission for the hosts.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

Figure 1:
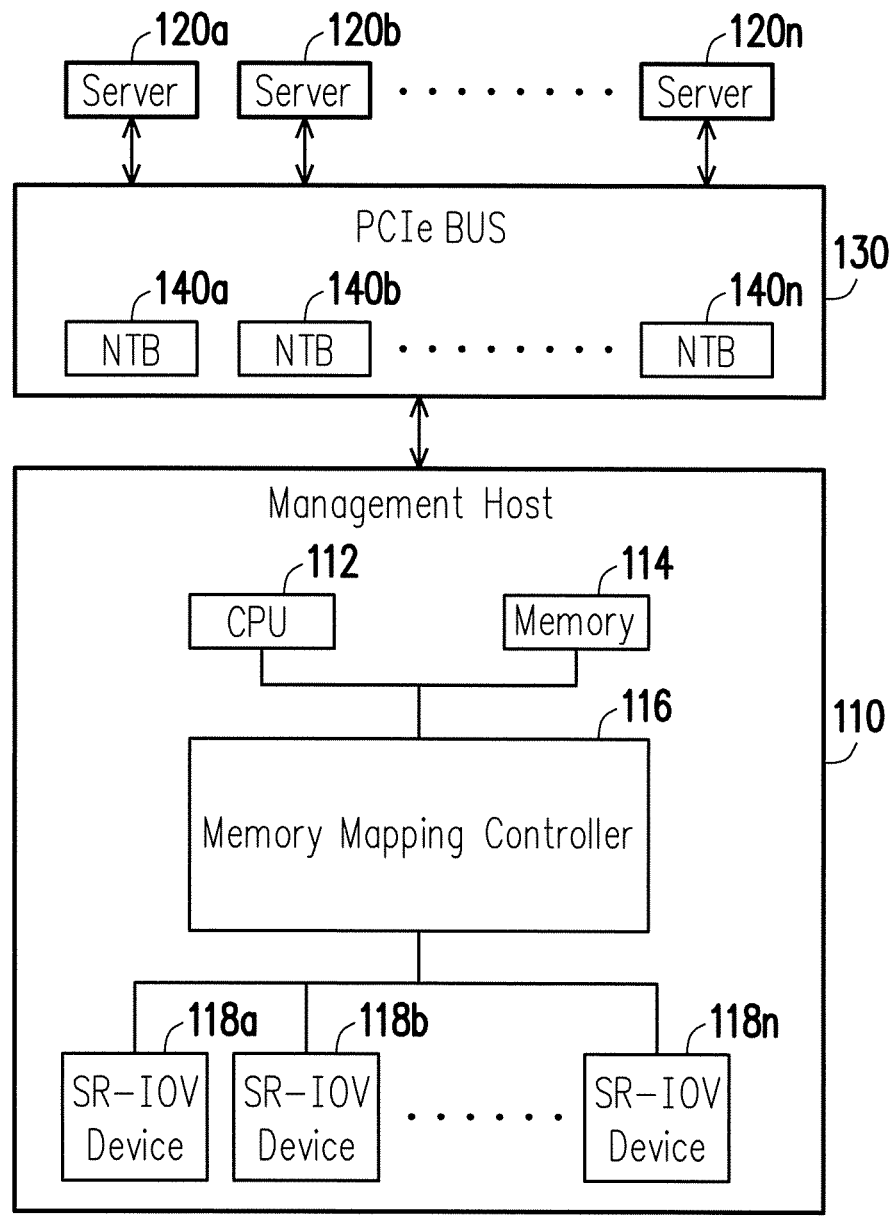
FIG. 1 is a block diagram illustrating a memory mapping system according to an exemplary embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Exemplary embodiments of the disclosure may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" ands "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Exemplary embodiments of the disclosure propose a network system and a network communication method of Ethernet over PCIe (PCIe based Ethernet over PCIe; referred to as EoP in short hereinafter) and Ethernet hybrid networks, which allow the EoP technology originally supports only an intra-rack packet transmission to support an inter-rack data transmission after combining with a communication method for a hybrid system proposed by the exemplary embodiments of the disclosure.

In the communication method for the hybrid system proposed by the exemplary embodiments of the disclosure, at least one or a part of the exemplary embodiments may include a controller and a network interface (Network Interface Card; referred to as NIC in short hereinafter). The network interface is built in with a capability of supporting EoP and Ethernet networks by setting a flow rule on the NIC through the controller so packets can be transmitted between machines among different racks. Accordingly, the network interface (NIC) can be a super network interface (Super Network Interface Card, SNIC) for supporting the EoP and Ethernet hybrid networks in some exemplary embodiments of the disclosure. Besides, such system also provides a broadcast service for Ethernet behavior while preventing a broadcast storm from happening. In one exemplary example, the controller may be constructed in a management host of one network system, or may be constructed in any one of hosts in the same rack in another exemplary example depending on the application environment. The disclosure is not limited to the above.

In the communication method for the hybrid system proposed by the exemplary embodiments of the disclosure, with use of the network communication method for a PCIe and Ethernet hybrid system, the network that originally supports only the EoP technology is able to conduct the intra-rack and inter-rack packet transmissions in a hybrid or Ethernet-compatible network environment through the exemplary embodiments of the disclosure.

Strategy for allowing the network that supports the EoP technology to conduct the intra-rack and inter-rack packet transmissions in the hybrid or Ethernet-compatible network environment includes, for example, allowing a user (network administrator) to add rules through the controller. To achieve aforesaid purpose, first of all, the controller performs a medium access control (referred to as MAC hereinafter) learning behavior. Next, the controller adds the rules for the corresponding NIC. Later, when conducting the intra-rack or inter-rack data transmissions, a host can conduct the data transmission according to unicast transmission rules added by the user (network administrator). To prevent the broadcast storm from happening, the communication method for the hybrid system proposed by the exemplary embodiments of the disclosure also establishes broadcast rules such that after discarding (dropping) the packet or sending the packet to the host or the controller, the NIC is able to stop a broadcast action for the packet.

In the disclosure, an EoP port on an EoP bus is configured to accelerate the intra-rack transmission for the hosts and conduct the inter-rack transmission in combination with an Ethernet port. More specifically, the EoP port is a PCIe port that adopts a memory mapping method, which is a port that can be implemented by adopting a software driver; in another embodiment, the EoP may also be a physical entity/hardware port.

The exemplary embodiments of the disclosure will be described in detail with reference to the drawings. Wherever possible, the same reference numbers are used in the drawings and the description to refer to the same or like parts.

FIG. 1 is a block diagram illustrating a memory mapping system according to an exemplary embodiment of the disclosure.

Referring to FIG. 1, a memory mapping system 100 of includes a management host 110, a PCIe bus 130, and a plurality of servers 120a to 120n. The servers 120a to 120n may be coupled to the management host 110 through the PCIe bus 130. Non-transparent bridges (referred to as NTBs hereinafter) on the PCIe bus 130 (i.e., 140a to 140n) performs memory address mapping between the management host 110 and the servers 120a to 120n. Specifically, each of the NTBs 140a to 140n is presented with two endpoints, and each of the endpoints handles memory address mapping in one direction. The management host 110 includes a Central Processing Unit (referred to as CPU hereinafter) 112, a memory 114, a memory mapping controller 116 and Single Root I/O Virtualization (referred to as SR-IOV hereinafter) devices 118a to 118n. The memory mapping controller 116 may control the memory address mapping between the management host 110 and the servers 120a to 120n. The SR-IOV devices 118a to 118n (e.g., 10 G Ethernet card) may be plugged onto the management host 110 and the virtual functions of the SR-IOV devices 118a to 118n may be shared to the servers 120a to 120n through the PCIe bus 130.

In an exemplary embodiment, an endpoint of the NTB 140a may map the address space of the management host 110 to the server 120a through the PCIe bus 130, while another endpoint of the NTB 140a may map the address space of the server 120a to the management host 110 through the PCIe bus 130. In this manner, an access to the memory of the management host 110 may be directed to the mapped memory address of the server 120a, and an access to the memory of the server 120a may be directed to the mapped memory address of the management host 110.

In multiple exemplary examples, the memory mapping controller 116 may be implemented as a software module or program codes. For instance, when a new server is detected on the PCIe bus, the program codes may be loaded into the memory 114 and executed by the CPU 112 so the mapping information between the management host 110 and the servers can be updated. However, the disclosure is not limited thereto. The memory mapping controller 116 may also be implemented as a hardware circuit that controls the memory address mapping between the management host 110 and the servers 120a to 120n.

Figure 2:
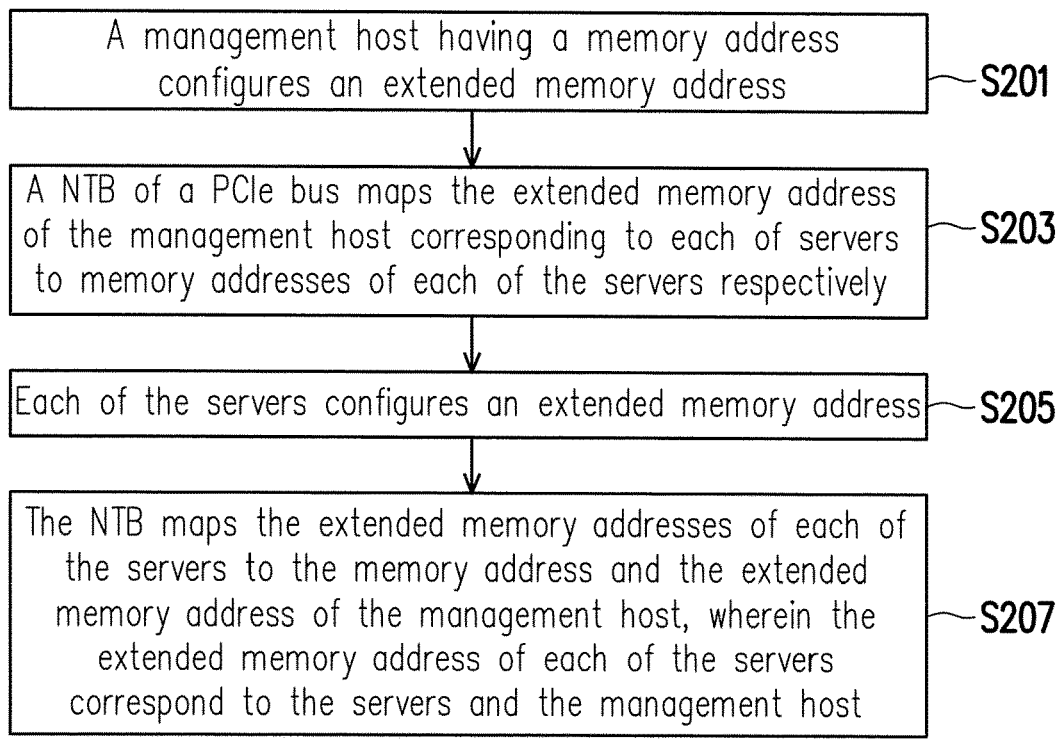
FIG. 2 is a flowchart illustrating a memory mapping method according to an exemplary embodiment of the disclosure.

FIG. 2 is a flowchart illustrating a memory mapping method according to an exemplary embodiment of the disclosure.

With reference to FIG. 2, in step S201, a management host having a memory address configures an extended memory address.

In step S203, the NTB of the PCIe bus maps the extended memory address of the management host corresponding to each of the servers to memory addresses of each of the servers respectively.

In step S205, each of the servers configures an extended memory address.

In step S207, the NTB maps the extended memory addresses of each of the servers to the memory address and the extended memory address of the management host, wherein the extended memory address of each of the servers correspond to the servers and the management host.

As described above, the memory mapping method of the disclosure constructs a global memory mapping structure in the servers and the management host such that the servers may share the virtual function of SR-IOV devices and communicate with each other with a global memory address mapping using only one BAR of each NTB function while utilizing the most bandwidth of the PCIe bus. In this way, the disclosure can have the EoP port implemented by the memory mapping method, and thereby increasing transmission bandwidth and reducing transmission latency. In other word, the disclosure may combine the PCIe port with the management host into the EoP port by the software module or the program codes.

Figure 3:
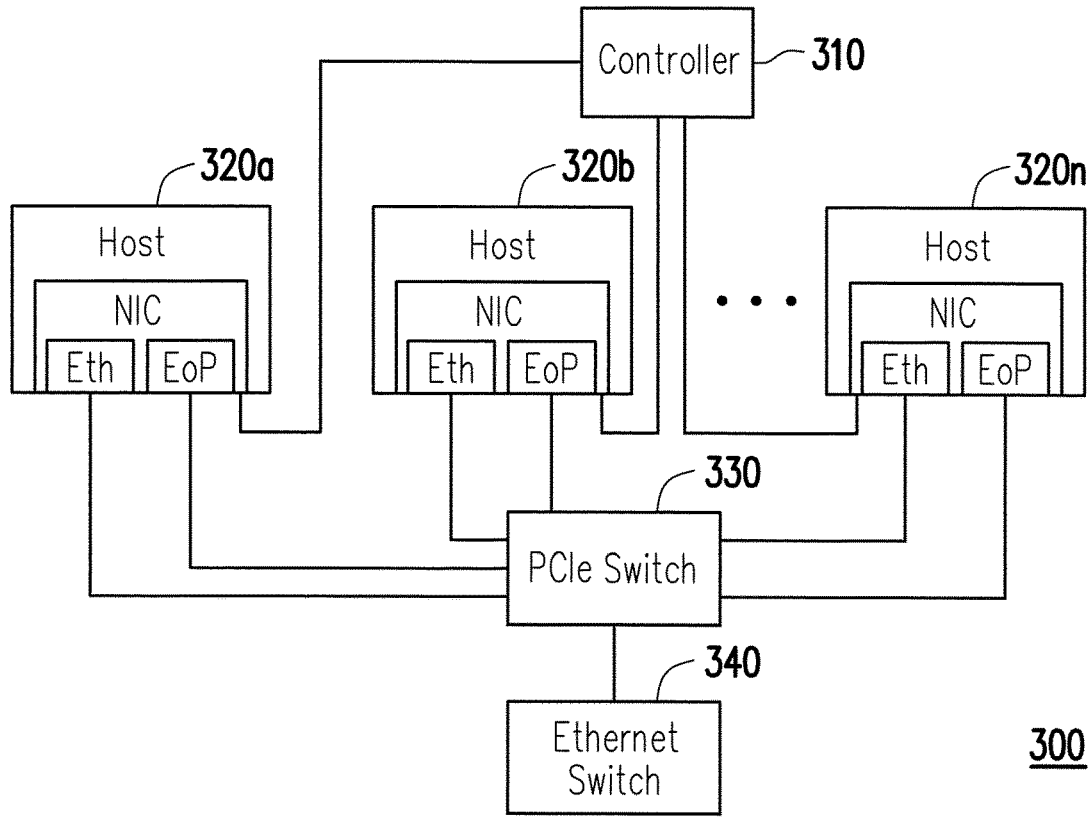
FIG. 3 is a block diagram illustrating an intra-rack network communication system according to an exemplary embodiment of the disclosure.

FIG. 3 is a block diagram illustrating an intra-rack network communication system according to an exemplary embodiment of the disclosure.

With reference to FIG. 3, a network system 300 includes a controller 310, a plurality of hosts 320a to 320n, a PCIe switch 330 and an Ethernet switch 340. Each of the hosts 320a to 320n includes an Ethernet port Eth and an EoP port. The Ethernet port Eth and the EoP port are coupled to the PCIe switch 330. Here, the hosts 320a to 320n may be servers or virtual servers, and the EoP port may be the port of the memory mapping system implemented by software or the physical port as described for FIG. 1 and FIG. 2. It should be noted that, the Ethernet port Eth and the EoP port may be combined into a network interface (NIC) by the software module or the program codes. Accordingly, the NIC may be a virtual switch, a driver module or other virtual modules, and the NIC may include at least one rule table so a packet can be transmitted or received according to a rule of the rule table. The controller 310 is coupled to the NICs of the hosts 320a to 320n and the NICs of hosts in the different racks, so as to monitor the hosts in the rack or outside the rack in real time. Specifically, a management network is formed between the controller 310 and the hosts of each rack, and such network is a network completely independent from a network among the hosts. It should be noted that, the controller 310 may be disposed in the rack, in the host or outside the rack, but the disclosure is not limited thereto. The PCIe switch 330 is coupled to the Ethernet switch 340 and configured to handle the intra-rack transmission, and can transmit or receive the packet to or from the different racks via the Ethernet switch 340. In multiple exemplary examples, the PCIe switch 330 may be disposed in the rack, in the host or outside the rack, but the disclosure is not limited thereto.

Figure 4:
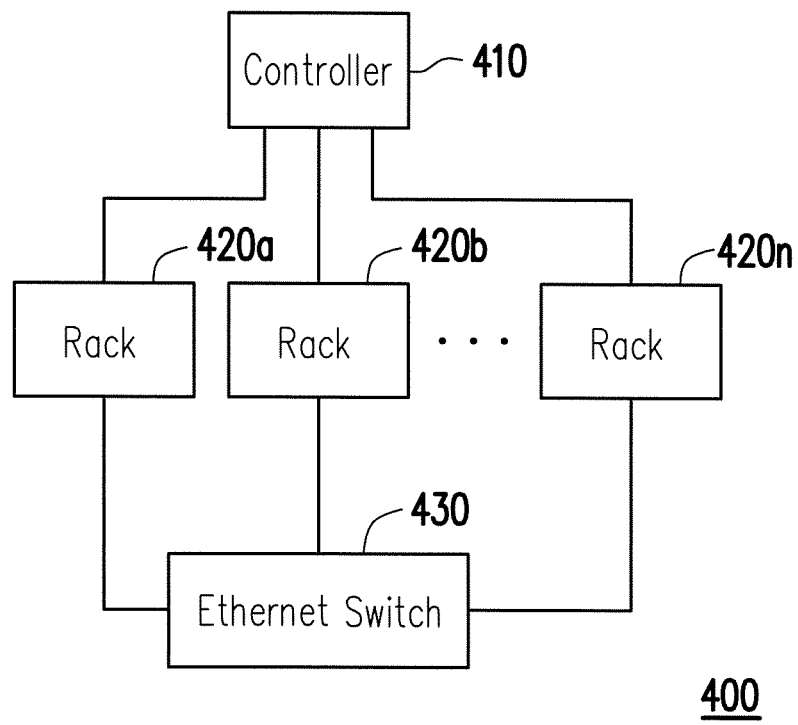
FIG. 4 is a block diagram illustrating an inter-rack network communication system according to an exemplary embodiment of the disclosure.

FIG. 4 is a block diagram illustrating an inter-rack network communication system according to an exemplary embodiment of the disclosure.

With reference to FIG. 4, a network system 400 includes a controller 410, racks 420a to 420n and an Ethernet switch 430. Also, the controller 410 and the Ethernet switch 430 are independent form the racks 420a to 420n, and each of the racks 420a to 420n includes at least one host. The controller 410 is coupled to the racks 420a to 420n to monitor and manage the host in each of the racks. In other words, a management network is formed by the controller 410 and the racks 420a to 420n. The racks 420a to 420n are coupled the Ethernet switch 430 to conduct the inter-rack transmission. In other words, when the hosts in the different racks transmit data to each another, since the Ethernet switch 430 is required for transmitting or receiving data, a data network independent from the management network is formed by the Ethernet switch 430 and the racks 420a to 420n.

With reference to FIG. 3 and FIG. 4, the NIC of the host in each of the racks 420a to 420n may transmit or receive the packet. Here, the packet is transmitted via the EoP port by adopting an EoP architecture based on PCIe for the intra-rack transmission, and the packet is transmitted via the Ethernet port Eth. for the inter-rack transmission. If the packet is a broadcast transmission, the packet is discarded or the packet is transmitted to the controller in response to the packet.

Figure 5:
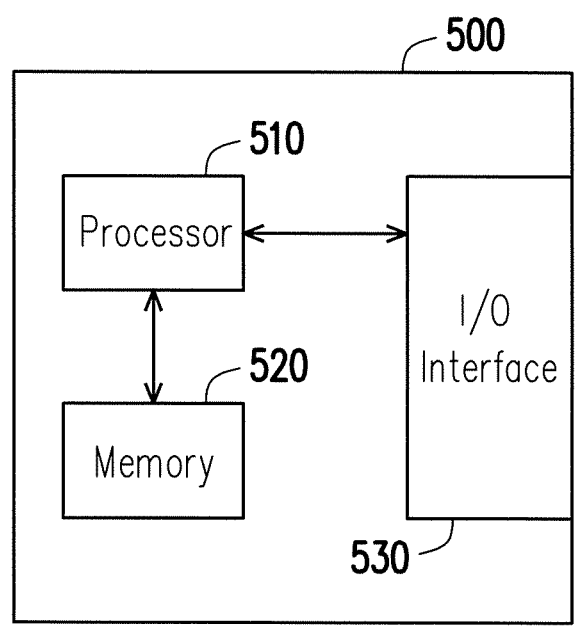
FIG. 5 is a block diagram illustrating a controller according to an exemplary embodiment of the disclosure.

FIG. 5 is a block diagram illustrating a controller according to an exemplary embodiment of the disclosure.

With reference to FIG. 5, a controller 500 includes a processor 510, a memory 520 and an input/output (I/O) interface 530. The processor 510 may be coupled to the memory 520 and the I/O interface 530, and the processor 510 pre-stores information regarding which port the EoP port and the Ethernet port are corresponding to, and which of the hosts are in the same rack in the memory 520. In other words, the memory 520 stores a rack mapping table and a port mapping table. Among them, the port mapping table includes a correspondence relation of the port of each host to the EoP port and the Ethernet port, and the rack mapping table records which rack each of the hosts is disposed in. Each time when there is a change in the relation of the port of each host to the EoP port and the Ethernet port, the processor 510 modifies the port mapping table in real time. Each time when the host is newly added to or removed from the rack, the processor 510 also modifies the rack mapping table in real time. When the controller 500 receives the packet via the I/O interface 530, the processor 510 analyzes the packet to obtain a media access control (MAC) address and port information. Here, the I/O interface 530 may be a wired network interface or a wireless transceiving interface, and the port information may be a pin of the host for receiving the packet. In addition, the processor 510 reads the port mapping table of the memory 520, and generates determination information by determining whether the port corresponds to the Ethernet port or the EoP port according to the port mapping table, so as to generate a rule according to the media access control address and the determination information and transmit the rule in return. For example, when the port information is the 15th pin of the host and the 15th pin is determined as the EoP port according to the port mapping table, the processor 510 sets the EoP port as the determination information.

Further, when an external source host broadcasts the packet to an external destination host, the processor 510 can receive the packet via the I/O interface 530. Here, the packet is from the NIC of the external destination host and the packet is determined according to the rule table as mismatching to all rules in the rule table. The packet includes the MAC address and the port information of the source host. Next, in accordance with the determination information generated by determining whether the port information is correlated to the EoP port or the Ethernet port of the NIC of the external destination host according to the port information, the processor 510 generates another rule according to the determination information and the packet and transmits said another rule to the external destination host via the I/O interface 530. Here, the external destination host stores said another rule to the rule table in response to the external source host, and the external host system no longer rebroadcasts the packet.

Figures 6, 7:
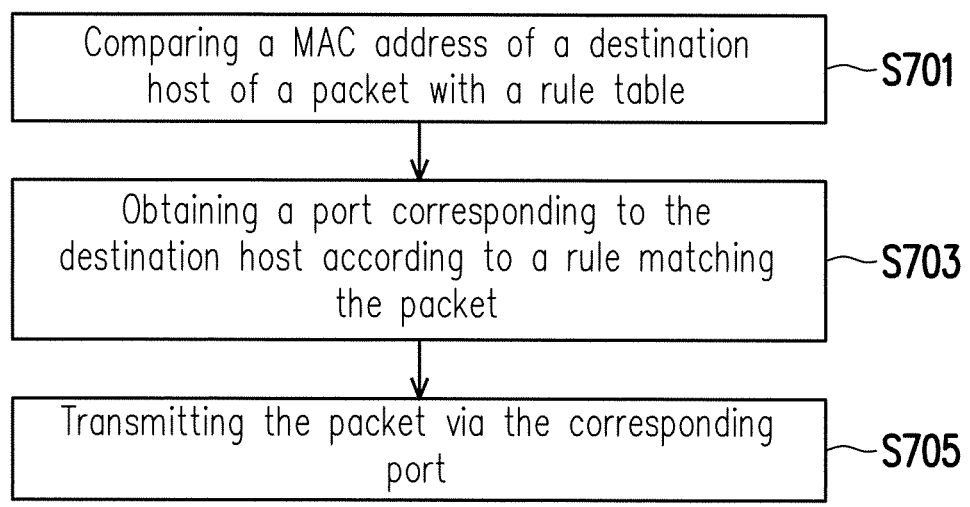
FIG. 6 is a schematic diagram illustrating a rule table according to an exemplary embodiment of the disclosure.
FIG. 7 is a flowchart illustrating a transmitter in the unicast transmission according to an exemplary embodiment of the disclosure.

FIG. 6 is a schematic diagram illustrating a rule table according to an exemplary embodiment of the disclosure.

With reference to FIG. 6, the rule table 600 includes at least one rule, and each rule at least includes MAC address fields 610*a* to 610*n* of the hosts and corresponding port fields 620*a* to 620*n*. In addition, each rule may further include a priority field. Specifically, when attempting to transmit the packet, each host searches the rule table according to the MAC address of the destination host in order to locate the corresponding port field, and transmits the packet to the destination host via the corresponding port. Here, the port field is the determination information generated by the controller. If it is found that the MAC address of the destination host matches two rules, the priority fields of the two rules are compared so the rule with higher priority can be picked out. Here, the port information may store the Ethernet port or the EoP port. When receiving the packet, each host searches the rule table according to the MAC address of the source host in order to determine whether the corresponding rule is present. If the corresponding rule is present and the packet is a broadcast transmission, the packet is discarded or transmitted to the controller according to the rule. If the corresponding rule is not present, the port information for receiving the packet is added to the packet to be transmitted to the controller. Here, the port information may be the pin of the host for receiving the packet.

FIG. 7 is a flowchart illustrating a transmitter in the unicast transmission according to an exemplary embodiment of the disclosure.

With reference to FIG. 7, in step S701, a source host compares a MAC address of a destination host of a packet with the rules in rule table. In other words, the MAC address of the destination host in the packet is directly retrieved so the MAC address can be compared with all rules in the rule table.

In step S703, a port corresponding to the destination host is obtained according to a rule matching the packet. Specifically, when the MAC address of the destination host in the packet matches the rule of the rule table, the port field of the rule is read so the port corresponding to the MAC address of the destination host can be obtained. Here, the port may be the EoP port or the Ethernet port. In multiple exemplary examples, if the MAC address of the destination host matches two rules, the port corresponding to the MAC address of the destination host is determined according to the priority fields in the rules.

In step S705, the packet is transmitted via the corresponding port. Specifically, if the corresponding port is the EoP port, the packet is transmitted via the EoP port to the destination host of the same rack. If the corresponding port is the Ethernet port, the packet is transmitted via the Ethernet port to the destination host of the different rack.

Figure 8:
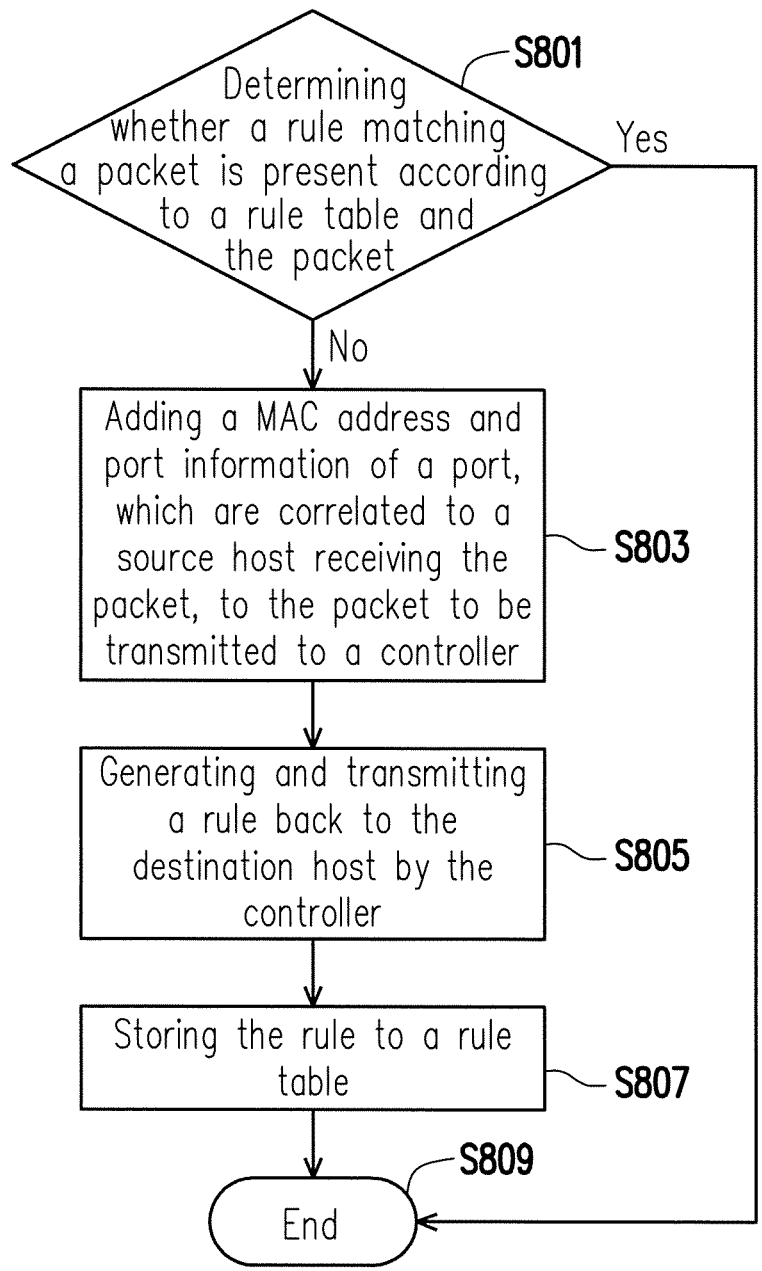
FIG. 8 is a flowchart illustrating a receiver in the unicast transmission according to an exemplary embodiment of the disclosure.

FIG. 8 is a flowchart illustrating a receiver in the unicast transmission according to an exemplary embodiment of the disclosure.

With reference to FIG. 8, in step S801, a destination host determines whether a rule matching a packet is present according to a rule table and the packet. Specifically, the destination host reads the MAC address in the packet, and reads the MAC address field of the rule in the rule table so as to compare whether a matching for the MAC address in the packet and the MAC addresses read out from the rule table is completed.

In step S803, if the matching is yet completed, the destination host adds a MAC address and port information of a port, which are correlated to a source host receiving the packet, to the packet to be transmitted to a controller. Specifically, the NIC of the destination host determines the pin for receiving the packet so as to generate the port information having pin information, and adds the port information and the MAC address of the source host to the packet to be transmitted to the controller.

In step S805, the controller generates and transmits a rule back to the destination host. Specifically, the controller generates a determination result (at least having information regarding the EoP port or the Ethernet port) by determining whether the port information belongs to the EoP port or the Ethernet port according to the port mapping table, generates the rule based on the MAC address of the source host of the packet and the determination result, and transmits the rule back to the destination host.

In step S807, the destination host stores the rule to a rule table. Specifically, the NIC of the destination host has the rule table configured in advance so each time when the NIC receives a new rule, the NIC can add the rule in the rule table as an update.

In step S809, when the rule table does not include the rule matching the packet received by the destination host or the NIC has the new rule added to the rule table, the unit transmission at the destination side is ended.

Figure 9:
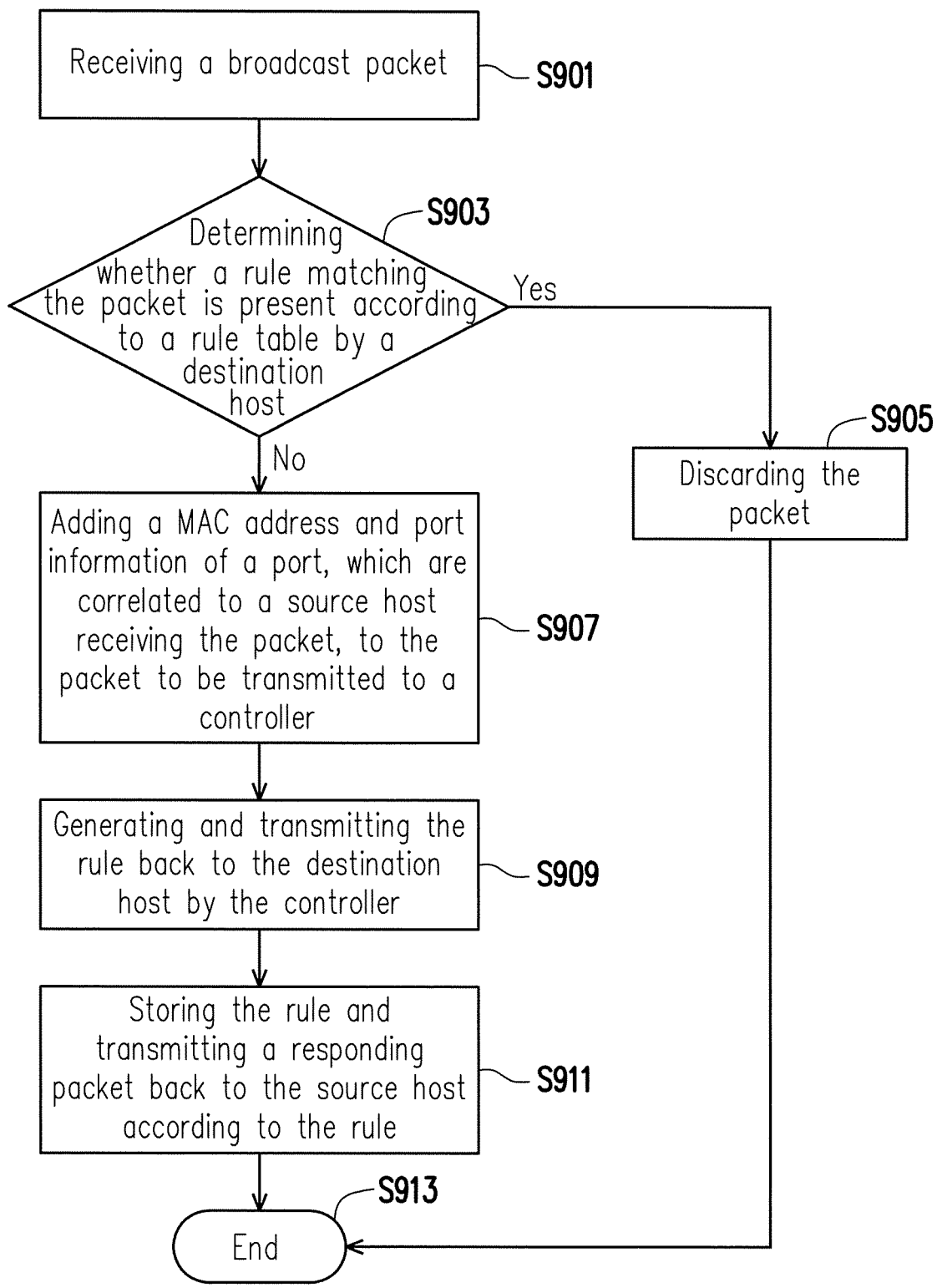
FIG. 9 is a flowchart illustrating a destination host in the broadcast transmission according to an exemplary embodiment of the disclosure.

FIG. 9 is a flowchart illustrating a destination host in the broadcast transmission according to an exemplary embodiment of the disclosure.

With reference to FIG. 9, in step S901, the destination host receives a broadcast packet. In other words, a packet with Address Resolution Protocol (ARP) broadcasted by the source host is received by at least one destination host.

In step S903, the destination host determines whether a rule matching the packet is present according to the rule table. Specifically, the destination host retrieves the MAC address in the packet and compares a MAC address with rules in the rule table one by one, so as to determine whether a matching is completed.

In step S905, if the matching is completed, the packet is discarded.

In step S907, if the matching is yet completed, a MAC address and port information of a port, which are correlated to a source host receiving the packet, are added to the packet to be transmitted to a controller. Specifically, the NIC of the destination host determines the pin for receiving the packet so as to generate the port information having pin information, and adds the port information and the MAC address of the source host to the packet to be transmitted to the controller.

In step S909, the controller generates and transmits the rule back to the destination host. Specifically, the controller generates a determination result by determining whether the port information belongs to the EoP port or the Ethernet port according to the port mapping table, generates the rule based on the MAC address of the source host of the packet and the determination result, and transmits the rule back to the destination host.

In step S911, the destination host stores the rule and transmits a responding packet back to the source host according to the rule. Specifically, the NIC of the destination host stores the rule to the rule table and generates the responding packet according to the rule and the MAC address of the destination host so the destination host can select the port according to the port field of the corresponding rule in order to transmit the responding packet in return. It should be noted that, if two rules of the rule table have the same MAC address, the rule of the port being EoP is set with higher priority, and the destination host preferentially transmits the responding packet according to the port with higher priority. The destination host transmits the packet according to the port with lower priority only if the port with higher priority is damaged.

In step S913, after the packet is discarded or the responding packet is transmitted back by the destination host, the destination host ends address resolution.

Figure 10:
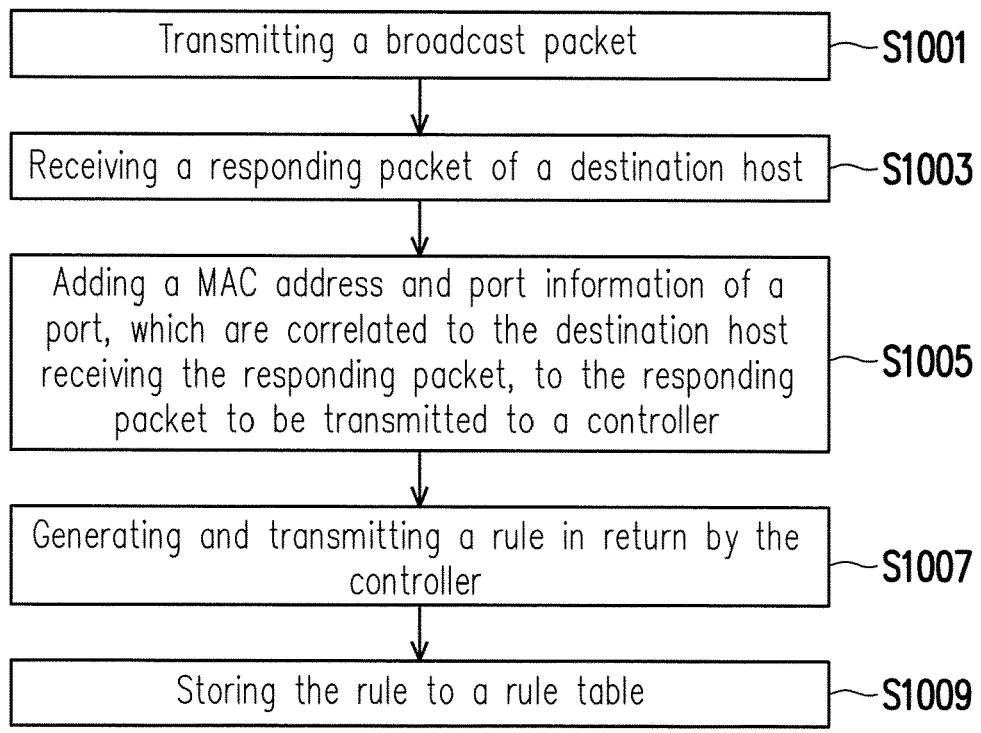
FIG. 10 is a flowchart illustrating a source host in the broadcast transmission according to an exemplary embodiment of the disclosure.

FIG. 10 is a flowchart illustrating a source host in the broadcast transmission according to an exemplary embodiment of the disclosure.

With reference to FIG. 10, in step S1001, in order to complete address resolution, a source host transmits a broadcast packet. Specifically, when the source host is in an initialization status, a controller transmits a broadcast rule to the source host, so as to generate a rule table having the broadcast rule. The source host generates the ARP packet according to the rule table and a MAC address of the source host so as to transmit the packet out from the EoP port and the Ethernet port. Accordingly, destination hosts of the same rack can receive the packet via the EoP port and the Ethernet port, whereas destination hosts of the different rack can receive the packet only via the Ethernet port. Here, the destination host discards the packet or transmit the packet to the controller according to the rule table of its own NIC.

In step S1003, the source host receives a responding packet of a destination host. Specifically, the source host can receive the responding packets of the destination hosts in the same rack via the EoP port, and can receive the responding packets in different racks via the Ethernet port.

In step S1005, the source host adds a MAC address and port information of a port, which are correlated to the destination host receiving the responding packet, to the responding packet to be transmitted to a controller. Specifically, the NIC of the source host detects the port for receiving the responding packet so as to generate the port information, and adds the port information and the MAC address of the destination host to the responding packet to be transmitted to the controller.

In step S1007, the controller generates and transmits a rule in return.

Specifically, the controller generates determination information by determining whether the port information belongs to the EoP port or the Ethernet port according to the port mapping table, generates a rule according to the MAC address and the determination information of the determination information receiving the responding packet to be transmitted back to the source host.

In step S1009, the source host stores the rule to a rule table. Specifically, the NIC of the source host receives the rule and stores the rule to the rule table so as to complete address resolution.

Figure 11:
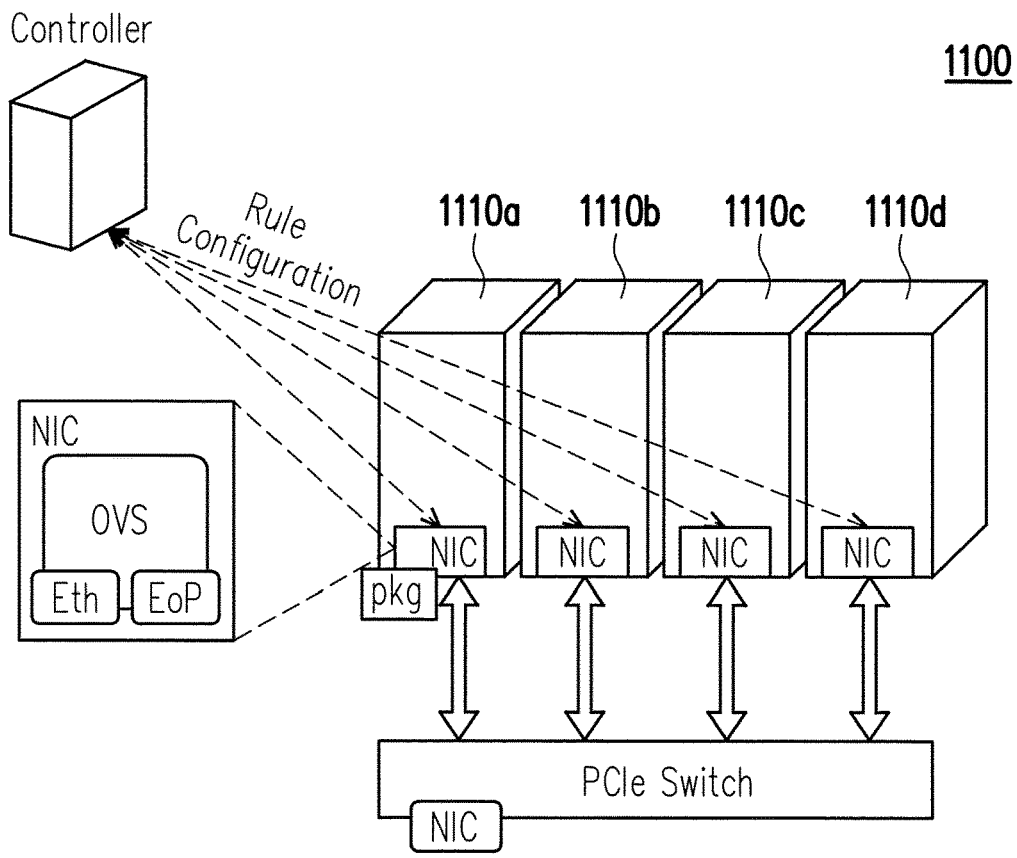
FIG. 11 is a schematic diagram illustrating an intra-rack network communication system according to an exemplary embodiment of the disclosure.
Figure 12:
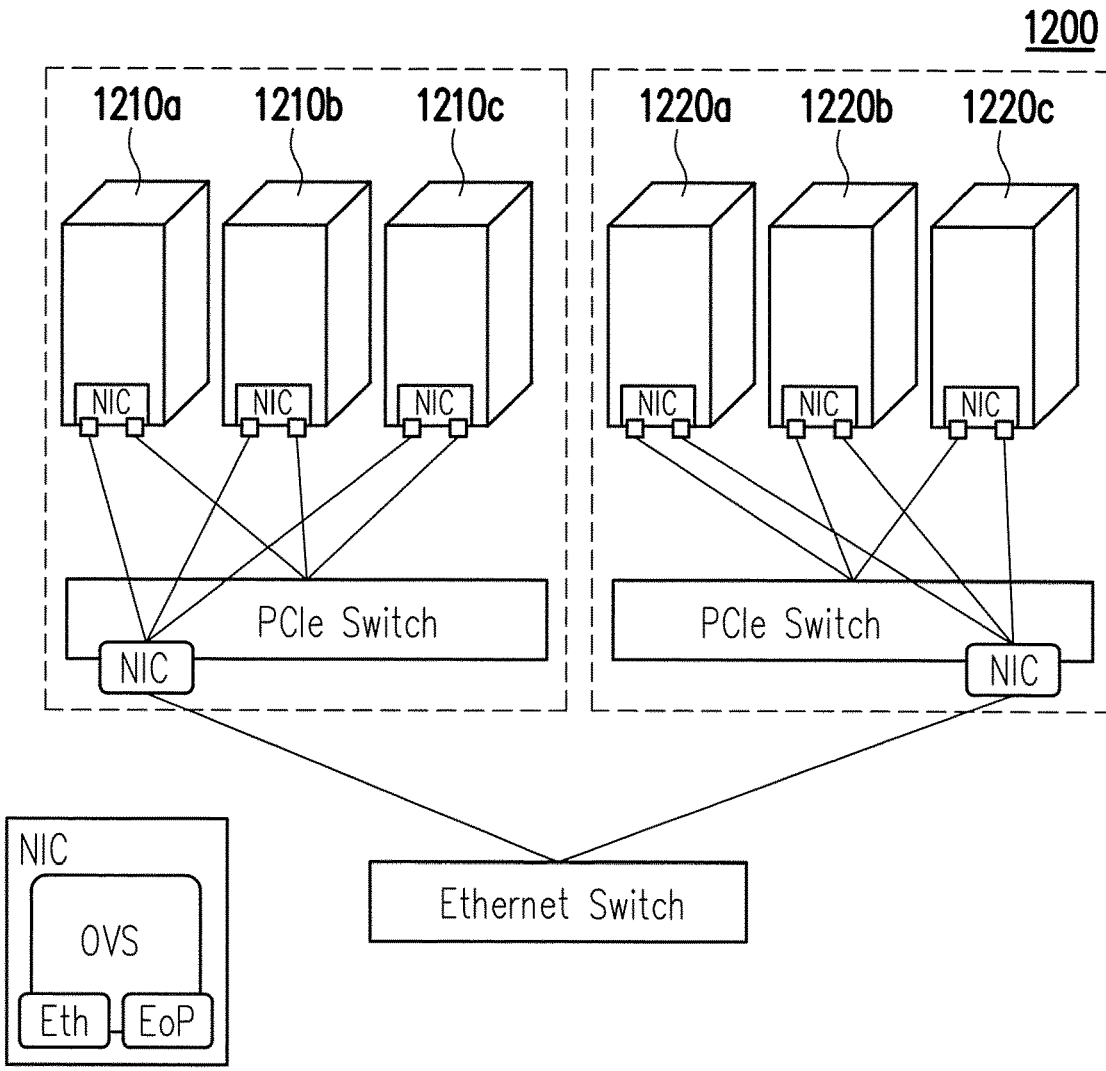
FIG. 12 is a schematic diagram illustrating an inter-rack network communication system according to an exemplary embodiment of the disclosure.

Practical usage of the exemplary embodiments of the disclosure will be described below with reference to FIG. 11 and FIG. 12. Wherever possible, the same reference numbers are used in the drawings and the description to refer to the same or like parts. FIG. 11 is a schematic diagram illustrating an intra-rack network communication system according to an exemplary embodiment of the disclosure. FIG. 12 is a schematic diagram illustrating an inter-rack network communication system according to an exemplary embodiment of the disclosure.

With reference to FIG. 11, an intra-rack network system 1100 may include a plurality of hosts 1110a to 1110d, a controller "Controller" and a PCIe switch. Here, each of the hosts 1110a to 1110d has the NIC. When the intra-rack transmission is to be conducted, the packet may be transmitted via the EoP port of the NIC of the host, and then transmitted to the EoP of the NIC of another host via the PCIe switch. For example, when the host 1110a transmits the packet to the host 1110b, the host 1110c or the host 1110d, the packet may be transmitted via the EoP port of the NIC of the host 1110a so the packet can be received via the EoP port of the NIC of the host 1110b, the host 1110c or the host 1110d.

With reference to FIG. 12, an inter-rack network system 1200 may include a plurality of intra-rack network systems (for example, the intra-rack network system 1100 in FIG. 11), PCIe switches and a controller (for example, the controller in FIG. 11, or a controller for the plurality of intra-rack network systems). With reference to FIG. 11 and FIG. 12, for example, hosts 1210a to 1210c belong to one rack, and hosts 1220a to 1220c belong to another rack. It should be noted that, the controller of the embodiment is disposed in one of the racks, but the disclosure is not limited thereto. When the inter-rack transmission is to be conducted, the packet may be transmitted via the Ethernet port of the NIC of the host, and then transmitted to the Ethernet port of the NIC of the host of another rack via the PCIe switch. For example, when the host 1210a transmits the packet to the host 1220a, the host 1220b or the host 1220c of said another rack, the packet may be transmitted by the Ethernet port of the NIC of the host 1210a so the packet can be received via the Ethernet port of the NIC of the host 1220a, the host 1220b or the host 1220c of said another rack. In addition, regardless of whether the intra-rack transmission or the inter-rack transmission is conducted, the NIC of the host will determine whether the rule correlated to the received packet is already stored. Upon determining that the rule correlated to the received packet is not present, the NIC will notify the controller to generate a new rule and store the new rule to the NIC.

Figure 13:
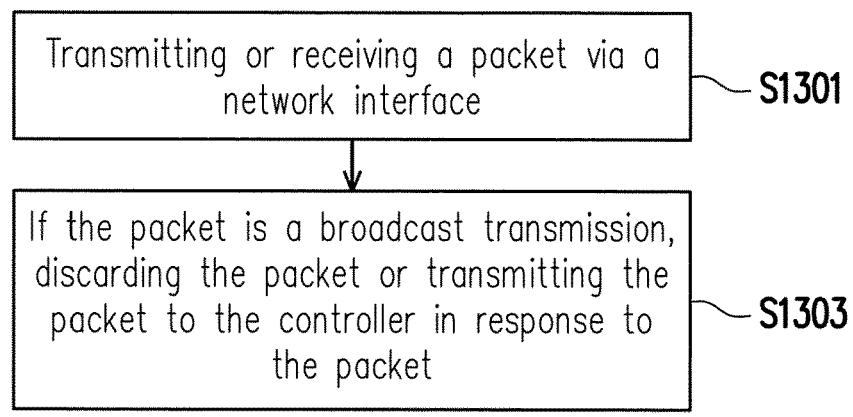
FIG. 13 is a flowchart illustrating a network communication method of PCIe and Ethernet hybrid networks according to an exemplary embodiment of the disclosure.

FIG. 13 is a flowchart illustrating a network communication method of PCIe and Ethernet hybrid networks according to an exemplary embodiment of the disclosure.

With reference to FIG. 13, in step S1301, a packet is transmitted or received via a network interface. Here, the packet is transmitted via the EoP port by adopting an EoP architecture for the intra-rack transmission, and the packet is transmitted via the Ethernet port for the inter-rack transmission.

In step S1303, if the packet is a broadcast transmission, the packet is discarded or the packet is transmitted to the controller to in response to the packet.

In summary, according to the network communication method of some exemplary embodiments of the disclosure, a transmission structure of PCIe and Ethernet hybrid networks among the hosts in the same rack or in the different racks is constructed so the hosts in the same rack can communicate with each other by adopting the EoP and the hosts in the different racks can communicate with each other by adopting the Ethernet port. Aforementioned functions in the disclosure, in some exemplary embodiments, may be integrated into a single network card which is capable of utilizing the maximum bandwidth of the PCIe bus to complete the inter-rack transmission without extra network cards being set. The previously described exemplary embodiments of the disclosure have the advantages aforementioned, where the advantages aforementioned not required in all versions of the disclosure.

It will be apparent to those skilled in the art that various modifications and variations can be made to the disclosed embodiments. It is intended that the specification and examples be considered as exemplary only, with a true scope of the disclosure being indicated by the following claims and their equivalents.

The invention claimed is:

1. A network communication method of Peripheral Component Interconnect Express (PCIe) and Ethernet hybrid networks, comprising:
    transmitting or receiving a packet via a network interface, wherein
    the packet is transmitted via an Ethernet over PCIe (EoP) port by adopting an EoP architecture for an intra-rack transmission, and
    the packet is transmitted via an Ethernet port for an inter-rack transmission; and
    if the packet is a broadcast transmission, discarding the packet or transmitting the packet to a controller in response to the packet;
    wherein if the packet is the broadcast transmission, a destination host receiving the packet discards the packet or transmits the packet to the controller in response to a source host transmitting the packet, the source host no longer re-broadcasts the packet, and the network communication method further comprises:
    discarding the packet or transmitting the packet according to a rule table of the network interface.

2. The network communication method of claim 1, wherein the rule table is stored in the network interface, and the step of discarding the packet or transmitting the packet according to the rule table of the network interface comprises:
    determining whether the packet matches the rule table by the network interface; and
    discarding the packet if the packet matches the rule table, and adding a media access control address and port information of the source host to the packet to be transmitted to the controller if the packet does not match the rule table, wherein the controller controls the destination host to respond the source host according to the packet.

3. The network communication method of claim 2, wherein the step in which the controller controls the destination host to respond the source host according to the packet comprises:
    generating determination information by determining whether the port information is correlated to an EoP port or an Ethernet port in a port mapping table of the controller, and storing the determination information to the controller; and
    generating a rule to be transmitted to the destination host according to the determination information and the media access control address and the port information of the source host, wherein the destination host stores the rule in the rule table so as to respond the source host according to the rule.

4. A network communication system of PCIe and Ethernet hybrid networks, comprising:
    a controller; and
    a network interface, coupled to the controller, and configured to execute operations of:
    transmitting or receiving a packet, wherein the packet is transmitted via an Ethernet over PCIe (EoP) port by adopting an EoP architecture based on a PCIe bus for an intra-rack transmission, and
    the packet is transmitted via an Ethernet port for an inter-rack transmission; and
    if the packet is a broadcast transmission, discarding the packet or transmitting the packet to a controller in response to the packet,
    wherein if the packet is the broadcast transmission, a destination host receiving the packet discards the packet or transmits the packet to the controller in response to a source host transmitting the packet, the source host no longer re-broadcasts the packet, and the packet is discarded or transmitted to the controller according to a rule table of the network interface.

5. The network communication system of claim 4, wherein the network interface is one of a virtual switch, a driver module or a virtual module.

6. The network communication system of claim 4, wherein the network interface determines whether the packet matches the rule table, the network interface discards the packet if the packet matches the rule table, and the network interface adds a media access control address and port information of the source host to the packet to be transmitted to the controller if the packet does not match the rule table, wherein the controller controls the destination host to respond the source host according to the packet.

7. The network communication system of claim 6, wherein the controller generates determination information by determining whether the port information is correlated to an EoP port or an Ethernet port in a port mapping table of the controller, and stores the determination information, so as to generate a rule to be transmitted to the destination host according to the determination information and the media access control address and the port information of the source host, wherein the destination host stores the rule in the rule table so as to respond the source host according to the rule.

8. The network communication system of claim 7, wherein the rule at least comprises the media access control address of the source host and the determination information.

* * * * *